United States Patent Office 3,077,219
Patented Feb. 12, 1963

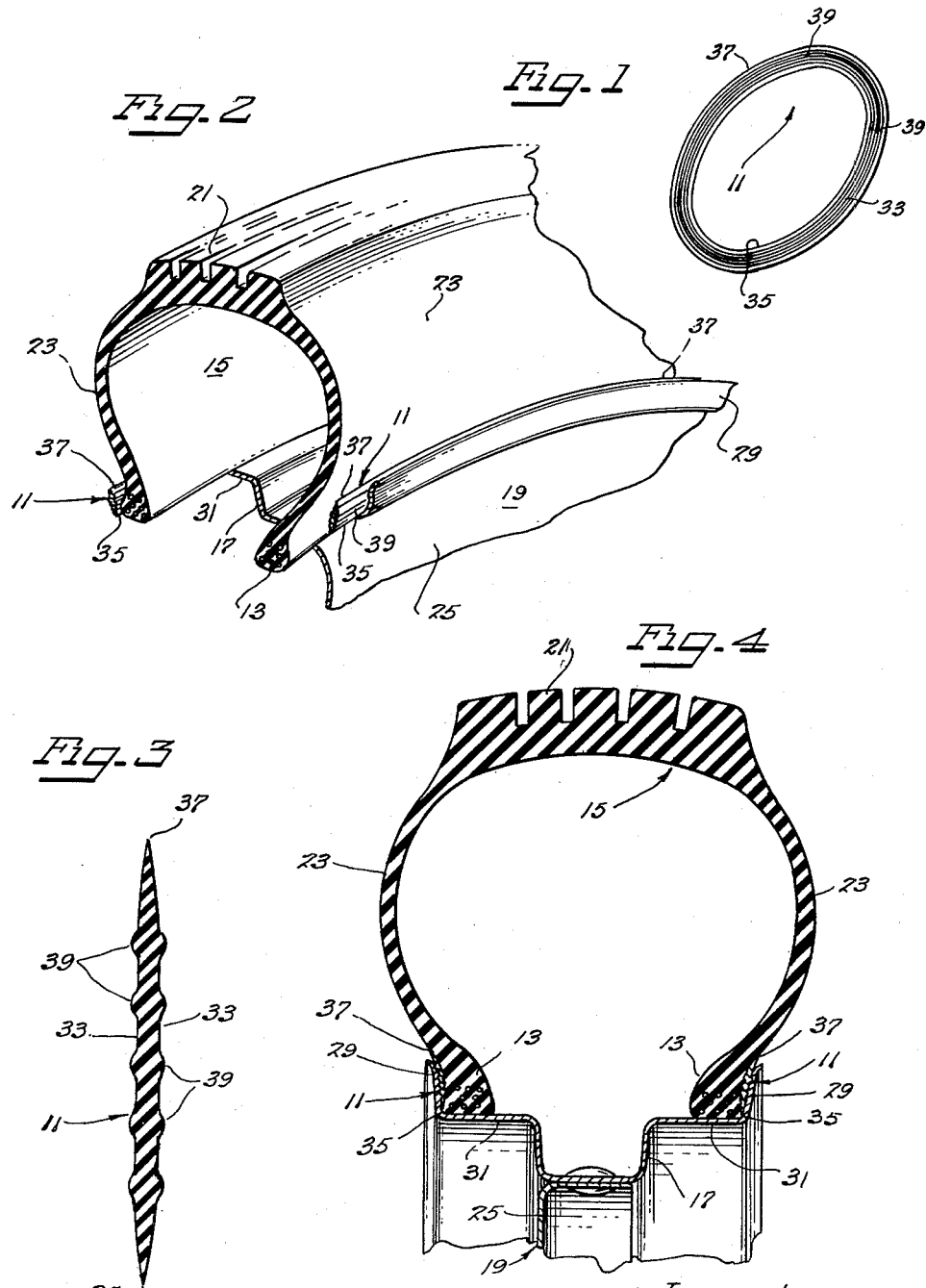

3,077,219
SEALING RING FOR TUBELESS TIRE
William Solomon, 1789 Rosemary Road,
Highland Park, Ill.
Filed Feb. 29, 1960, Ser. No. 11,819
1 Claim. (Cl. 152—330)

This invention relates generally to the sealing of pneumatic tires, and more particularly to a sealing ring which is interposable between the bead of a tubeless tire and the rim of a wheel to prevent leakage of pressure air after inflation of the tire and wheel assembly.

Many modern vehicles are equipped with tubeless pneumatic tires, i.e., tires which are inflated without the use of an inner tube and which rely on an air-tight engagement between the bead of the tire and the rim of the wheel to maintain the pressure within the tire. Unfortunately, the mating surfaces of the rim and of the bead are often damaged to such an extent that an air-tight seal can no longer be maintained directly therebetween. Damage which results in an ineffective seal can occur in many and various ways. For instance, either the bead could be damaged during demounting and subsequent mounting of the tire on the rim in the course of repair after a flat; stones, pebbles or other road grit can become caught between the tire and the rim, eventually causing rupture of the seal and damage to the mating surfaces; or moisture can become entrapped between the bead and the rim, thereby engendering the formation of rust and the future loss of sealing engagement between the bead and the rim. Re-establishment of a seal between the bead and the rim can be easily and inexpensively accomplished through the use of the novel sealing ring disclosed herein.

Accordingly, the principal object of the invention is a sealing ring for re-establishing an air-tight seal between the bead of a tubeless tire and the rim of a wheel when the bead and rim are not capable of forming, by themselves, an air-tight seal. A further object of the invention is a ring of conformable material which is adapted to be seated against the rim of a wheel and in position for engaging receipt of the bead of a tubeless tire to create, between the rim and the bead, an air-tight seal. A still further object of the invention is the combination of such a ring together with, and intermediate of, the rim of a wheel and the bead of a tubeless tire in an assembly capable of preventing the escape of pressure air.

Other objects and advantages of the invention will become apparent by reference to the following description and the accompanying drawings in which:

FIGURE 1 is a perspective view of a sealing ring embodying various features of the invention;

FIGURE 2 is an enlarged fragmentary perspective view, partially in section, illustrating assembly of the ring shown in FIGURE 1 between the bead of a tubeless tire and the rim of a wheel;

FIGURE 3 is an enlarged cross sectional view of the ring shown in FIGURE 1; and

FIGURE 4 is an enlarged cross sectional view of the tire, wheel and ring assembly shown in FIGURE 2.

Generally, the drawings are illustrative of a sealing ring 11 in accordance with the invention and its intended interposition between the bead 13 of a tubeless tire 15 and the rim 17 of a wheel 19 to establish an air-tight connection therebetween. With respect to the tubeless tire 15 and the wheel 19 upon which the tire is mountable, both are of conventional construction which can be observed at any automobile service station. As is usual, the tire 15 includes, in addition to the bead 13, a tread 21 and side walls 23. The wheel 19 incorporates a disk 25 in addition to the rim 17 which is of the drop center type and which includes a pair of outwardly flaring flanges 29 extending from spaced shoulders 31.

The sealing ring 11 comprises an endless annular member of natural or synthetic rubber, or any other material having similar characteristics of conformability and elasticity. The conformability characteristic of the ring material facilitates use of generally flat rings which are self-accommodating to the contour of the bead and of the rim flange to provide intimate sealing engagement therewith. Of course, the ring could be fabricated with a curved contour corresponding generally to the flaring inner surface of the flanges 29. On the other hand, the elasticity of the ring material permits stretching of the ring for passage over the outer extremity of the rim flange so that it can be seated in position on the inner face of the flange, as seen particularly in FIGURE 3. Preferably, when the ring is properly seated on the flange, a small but, nevertheless, sufficient amount of tension is retained in the ring 11 to maintain it in proper position prior to engagement therewith of the bead 13 of the tire 15. In this connection, it is preferred to fabricate rings of several diameters to accommodate the various wheel diameters now in use.

The ring 11 incorporates a radially elongated cross section which is defined by a pair of side faces 33 and which is relatively thin, preferably between $\frac{1}{16}$ of an inch to $\frac{1}{8}$ of an inch, to reduce the amount by which the bead 13 is inwardly displaced from its normal position of engagement with the rim 17. Preferably, the length of the side faces 33 corresponds approximately with the depth of the flange 29 so that a maximum area is available to provide a reliable air-tight seal.

It is also highly desirable for the side faces 33 of the ring 11 to taper toward a narrow edge 35 along the inner periphery of the ring for smooth merger with the laterally adjacent surfaces of the bead 13 and rim 17. This construction tends to prevent the formation, at the inner periphery of the ring, of an air pocket having a tendency to unseat the bead from the ring, or the ring from the rim, thereby weakening and possibly rupturing the seal normally produced. Preferably, when the ring 11 is placed in position on the rim 17, the inner edge 35 of the ring should extend into the corner formed by the flange 29 and shoulder 31 of the rim. With the ring 11 thus located, and the bead 13 subsequently seated against the ring and against the shoulder 31 of the rim 17, the tendency for development of an air pocket at the inner periphery of the ring is effectively prevented. Moreover, even if the inner periphery of the ring does not extend into the corner or, on the other hand, extends beyond the corner onto the shoulder 31, its narrow edge 35, as explained, causes a minimum dislocation of the bead 13 from the rim 17 thereby practically eliminating any tendency toward the development of an air pocket. The outer periphery of the ring can also taper toward a narrow edge 37, as shown in FIGURE 4, so that the outer periphery of the ring will blend smoothly into the side wall 23 of the tire.

Each of the side faces 33 of the sealing ring 11 is preferably provided with one or more endless ribs or ridges 39, each of which can be considered as providing a separate seal with the abutting bead 13 or rim 17. However, some of the advantages of the invention can still be realized if the ribs 39 are omitted from one of the side faces 33 when such face is emplaced against a bead or rim which is not damaged, or at least, not to an aggravated extent. In some cases, depending upon the conformability of the ring, a relatively smooth faced ring 11 can be effectively utilized to provide an air-tight seal. However, in order to provide a single ring capable of sealing interposition between the bead 13 and the rim 17, notwithstanding relatively severe or aggravated damage to either or both, each of the faces 33 of the disclosed ring 11 is preferably provided with several concentric ribs 39, such as shown in FIGURE 4. When a sealing ring having a cross section similar to that shown in FIGURE 4 is utilized between the bead and the rim, there is provided, in effect, a plurality of seals, one along each rib 39 and one along each of the tapering face portions, all of which insure against loss of pressure air.

One sealing ring which provided an effective seal when interposed between a leaking bead and rim assembly was made of natural rubber and had a thickness of approximately 3/32 of an inch. Each face 33 had a width of approximately 1 inch with five ribs 39 on each side.

In use, the sealing ring 11 can be easily seated against the inner surface of the flange 29 after the tubeless tire 15 has been mounted on the rim 17 but before it is inflated, and when the adjacent bead 13 is displaced laterally from the flange 29. As pointed out before, the stretchability of the ring 11 permits it to be slipped over the outer edge of the rim 17 and properly seated on the flange 29. The tire 15 can then be shifted laterally from against the opposite flange to interpose another sealing ring, if one is considered desirable, between the other flange and bead. Subsequently, the introduction of pressure air within the tire 15 will seat the bead 13 tightly against the ring 11, and the ring 11 tightly against the rim 17 to establish an effective seal against the loss of pressure air from within the tire.

Various features of the invention are set forth in the appended claim.

I claim:

A tubeless tire assembly which comprises a wheel having a rim including a pair of spaced shoulders that define a major portion of the peripheral surface of said rim and a pair of outwardly flaring flanges that extend radially from said spaced shoulders; a resiliently deformable sealing ring positioned on an inner face of at least one of said flanges and extending from the junction of said shoulder and said flange to beyond the radial edge thereof; and an inflated tubless tire mounted on said wheel and including a base portion that bears against said shoulder and a bead that is seated firmly against said resiliently deformable sealing ring, said sealing ring being under a slight tension when positioned on tthe inner face of said flange so that said sealing ring frictionally grips said face, said ring having a relatively narrow elongated cross-section defined by a pair of side faces that merge to narrow edges at the inner periphery of the ring adjacent the junction of said shoulder and said flange and at the outer periphery of said ring, said side faces having a substantially uniform taper such that the edges of said ring merge in sealing relation with the tire bead seated thereagainst, each of said side faces being formed with a plurality of endless ribs, said ribs projecting outwardly from said faces at substantially corresponding locations so that the ribs extending from one of said side faces are maintained in intimate sealing contact with said bead and the ribs extending from the corresponding location on the other of said side faces are maintained in intimate sealing contact with the inner face of said flange.

References Cited in the file of this patent
UNITED STATES PATENTS 2,709,472 Hofweber _____ May 31, 1955

FOREIGN PATENTS 947,441 Germany _____ Aug. 16, 1956

OTHER REFERENCES

Continental German application 1,023,983, printed Feb. 6, 1958 (Kl 63eW).